United States Patent [19]
Weeks

[11] Patent Number: 5,590,824
[45] Date of Patent: Jan. 7, 1997

[54] INTERLOCK PANEL

[76] Inventor: Bruce V. Weeks, 12998 Worthington Rd. NW., Pataskala, Ohio 43062

[21] Appl. No.: 318,963

[22] Filed: Oct. 6, 1994

[51] Int. Cl.⁶ .................................................. B60R 7/00
[52] U.S. Cl. .................... 224/42.33; 224/42.32; 224/42.34
[58] Field of Search ............... 224/273, 42.32, 224/42.33, 42.34, 42.36, 42.40; 220/552, 529, 532, 533, 543, 544, 549; 296/37.1, 37.5, 37.6; 228/120.36, 120.07; 211/184, 189

[56] References Cited

U.S. PATENT DOCUMENTS

| | | | |
|---|---|---|---|
| 4,499,997 | 2/1985 | Swingley, Jr. ........................... | 224/552 |
| 4,595,246 | 6/1986 | Bross ....................................... | 220/552 |
| 5,052,580 | 10/1991 | Khoury .................................. | 220/552 |
| 5,096,056 | 3/1992 | Garcia .................................... | 220/552 |
| 5,185,982 | 2/1993 | Hostetler ................................ | 52/646 |

*Primary Examiner*—David J. Walczak
*Attorney, Agent, or Firm*—Thomas S. Baker, Jr.

[57] ABSTRACT

An improved interlock panel for incorporation into a cargo space divider assembly is provided with a pair of stepped grooves throughout its length to facilitate manual insertion and manual removal of the panel into cooperation with another interlock panel, and with a retention clip member that restricts panel tilt about its base and thereby improves panel vertical stability.

10 Claims, 4 Drawing Sheets

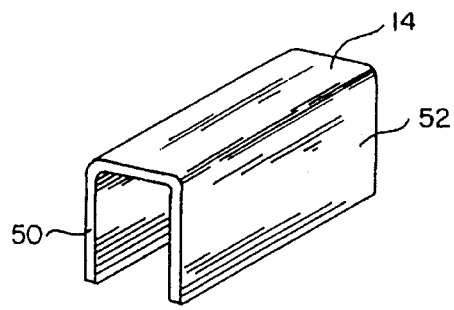
FIG. 3A
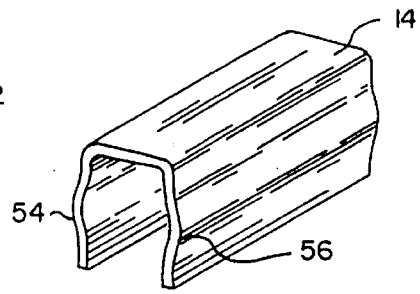
FIG. 3B
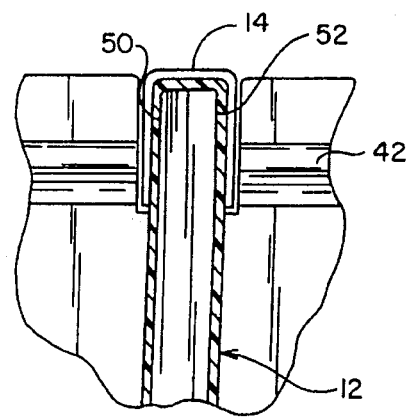
FIG. 5
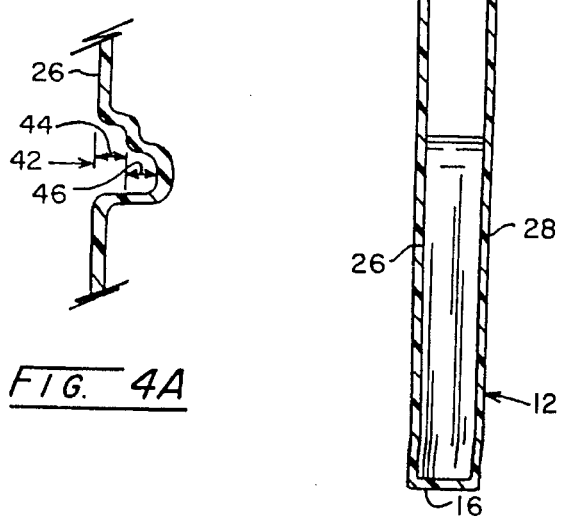
FIG. 4
FIG. 4A

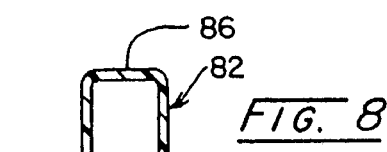
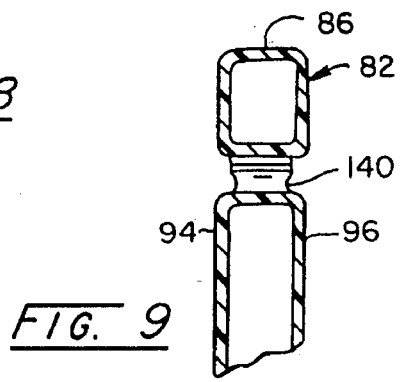
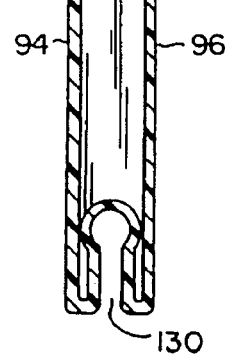
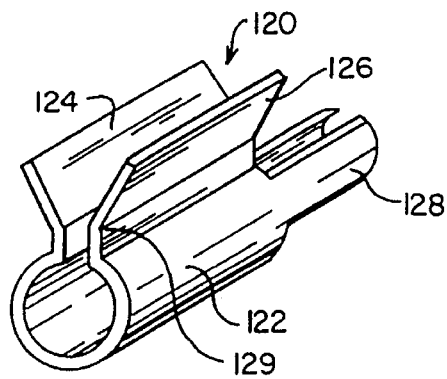
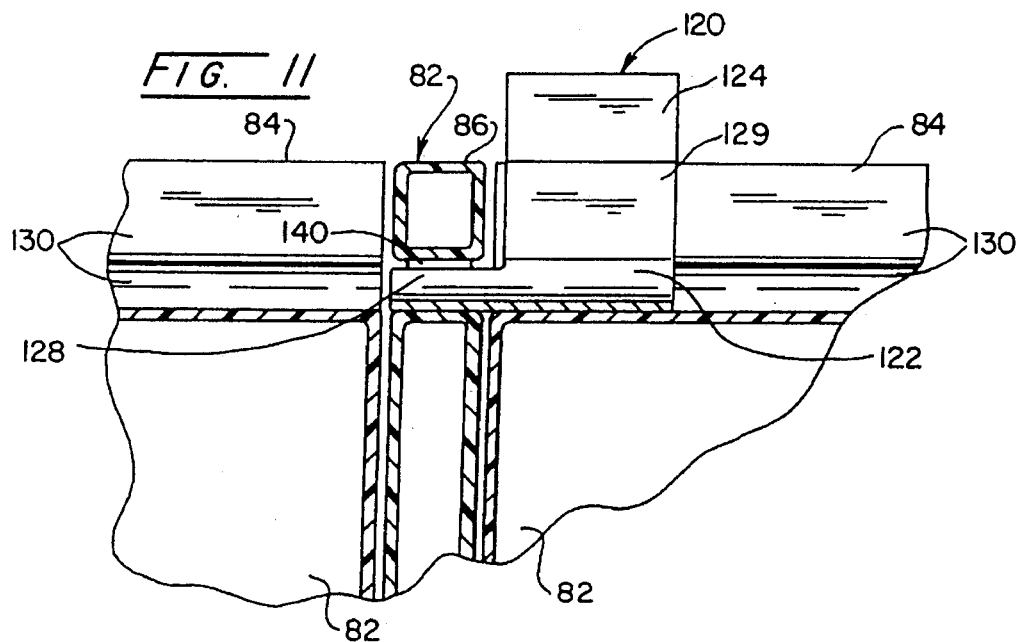

INTERLOCK PANEL

FIELD OF THE INVENTION

This invention relates generally to vehicle cargo space dividers, and particularly concerns a novel-interlock panel which may be utilized in combination with other like interlock panels to form variably-sized cargo restraint compartments.

BACKGROUND OF THE INVENTION

Known vehicle cargo space dividers, including the interlock panel and cargo space divider constructions disclosed and claimed in my co-pending application for U.S. Pat. No. 08/074,585 filed Jun. 11, 1993, offer many advantages in the stowage of separate items such as grocery bags, containers of liquid, tools, briefcases, suitcases, and other similarly-sized articles in a vehicle cargo space to prevent lateral movement of the stowed items during vehicle acceleration and stopping. Generally, such interlock panel and cargo space divider constructions permit the formation of multiple, individual compartments which may be modified in size by the removal and reinstallation of individual interlock panels in different locations. However, the provision of such capability in the known interlock panel and cargo space divider constructions has led to observed construction deficiencies. For instance, due to the use of economically justified manufacturing methods, the furnished interlock panels when properly combined do not offer the degree of panel vertical stability that is often desired. Also, because of problems in manually grasping the upper edges of interlock panels to be removed and reinstalled in a different location, hand injuries in the form of broken fingernails have frequently been noted.

The improved interlock panel and cargo space divider constructions disclosed and claimed in the application overcome the above-discussed known prior art disadvantages.

SUMMARY OF THE INVENTION

The improved interlock panel of this invention is adapted to cooperate with at least one other similar interlock panel to form a portion of a vehicle cargo space divider structure having a plurality of individual compartments of desired size. The improved interlock panel comprises a rigid unitary member having a base, a top surface, a central portion intermediate said base and said top surface, first and second end surfaces which define the length of said member, and spaced first and second side surfaces which define the thickness of the member. A plurality of laterally spaced teeth are formed in the member and project downwardly from the central portion of the member. Each of such teeth has a pair of lateral side walls and a longitudinally extending tooth edge formed from a portion of the member base. Spaced-apart lateral side walls of adjacent teeth define a lateral tooth slot having a slot bottom edge which adjoins the lateral tooth side walls. Extending along the length of each interlock panel adjacent the top surface and in each side surface are opposed molded and stepped grooves. Such grooves function to provide an improved gripping surface for engagement by human fingers when the interlock panel is being held and inserted in a particular position or removed and reinserted in another position.

In order to accommodate either of two different forms of a retainer clip element which may be installed in the assembled interlock panels to provide an improved degree of panel vertical stability and thereby prevent or at least minimize the rattling of adjacent panels at a panel intersection, each interlock panel is provided along or near its top surface either with spaced-apart pairs of narrow restraint slots of width and depth sufficient to accommodate the legs of a U-shaped clip element or with spaced-apart through restraint openings that are sized to receive an extension portion of a different form of retainer clip member. Each restraint slot or through restraint opening along or near the interlock panel top surface is basically aligned with a lateral side wall of a lateral tooth slot. If desired, those portions of the opposed side surfaces which are located above the stepped grooves may be outwardly offset with respect to the remaining side surface portions to provide greater member upper edge thickness and thereby facilitate manual grasping of the member during either installation or removal and reinstallation.

DESCRIPTION OF THE DRAWINGS

FIGS. 3A and 3B are perspective view of two different clip extrusions satisfactory for use in one embodiment of the retainer clip utilized in the present invention;

FIG. 4 is a sectional view taken at line 4—4 of FIG. 1;

FIG. 4A is an enlarged view of one of the stepped grooves engaged by the fingertips of a user's hand as depicted in FIG. 4;

FIG. 5 is a partial sectional view taken at line 5—5 of FIG. 1.

FIG. 8 is a sectional view taken along line 8—8 of FIG. 6;

FIG. 9 is a sectional view taken along line 9—9 of FIG. 7;

FIG. 10 is a perspective view of a second form of retainer clip utilized in the practice of the instant invention; and FIG. 11 is a sectional view illustrating the manner in which the retainer clip element of FIG. 10 cooperates with the through restraint openings provided in the interlock panels of FIGS. 6 and 7.

P DETAILED DESCRIPTION

Figure 1:
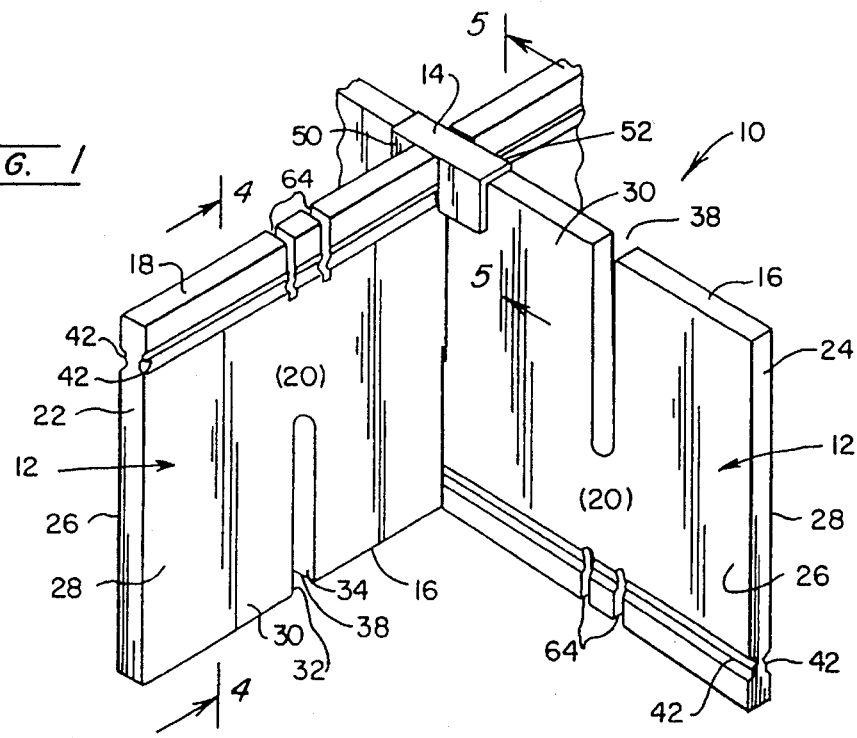
FIG. 1 is a perspective view of a pair of improved interlock panels constructed in accordance with the present invention in joined relation and restrained at their zone of intersection by a novel U-shaped clip element.

FIG. 1 illustrates a portion of a cargo space divider assembly 10 comprised of two joined interlock panels 12, each a preferred embodiment of the present invention, and a cooperating U-shaped retainer clip element 14. Panels 12 are typically identical in construction but in their cooperating joined relation one is inverted with respect to the other.

Figure 2:
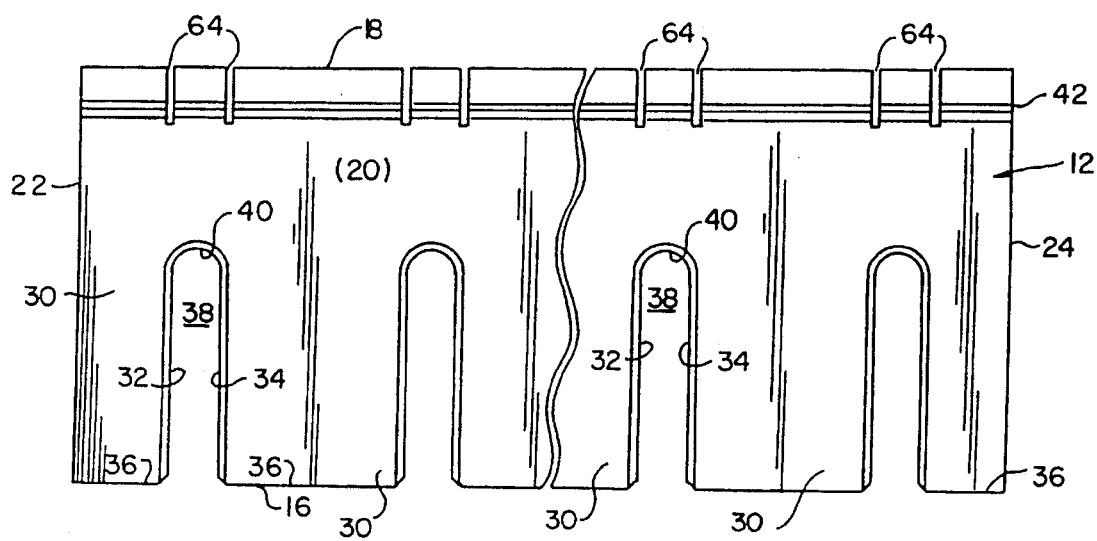
FIG. 2 is an elevational view of one of the interlock panels of FIG. 1.

Referring to FIG. 2, the preferred interlock panel 12 has a base 16, a top surface 18, and a central portion 20 which extends between said base 16 and said top surface 18. Base 16 and top surface 18 define the height of panel 12. The length of panel 12 is defined by a pair of end surfaces 22 and 24. A pair of opposite side surfaces 26 and 28 define the thickness of interlock panel 12. Panel 12 may have any desired length, height, or thickness.

A plurality of laterally spaced teeth 30 project downwardly (FIG. 2) from central portion 20 of panel 12. Each tooth 30 has a pair of lateral side walls 32 and 34 and a longitudinally extending front tooth edge 36 formed from a portion of base 16. It may be seen that the spaced lateral side walls 32 and 34 of adjacent teeth define a lateral tooth slot 38. The closed end of slot 38 is defined by a slot closure 40 which joins lateral side walls 32 and 34.

Each of opposite side surfaces 26 and 28 is provided with a stepped groove 42 having a first offset 44 and also a second (and deeper) offset 46 as may be seen by referring to FIGS. 4 and 4A. Groove 42 preferably extends throughout the length of each interlock panel 12, and typically is positioned a relatively short distance from panel top surface 18, as shown in FIG. 4, groove offset 44 functions to develop a groove undersurface portion that accommodates the tip of a user's finger or thumb. Groove offset portion 46 functions to separately accommodate the nail portion of the user's finger or thumb thus providing a means for avoiding broken fingernails which otherwise frequently occur in the course of inserting or removing and reinserting an interlock panel in a cargo space divider assembly. As noted previously, in some instances it may be desirable to provide in interlock panel 12 a thickness between side surfaces 26 and 28 which is greater above (FIG. 4) stepped groove 42 and reduced below groove 42. In other instances it may be desired to provide interlock panel 12 with a uniform thickness between side surfaces 26 and 28 throughout both its vertical extent and its horizontal extent.

To make the insertion and removal of individual interlock panels in a combined panel array easier, it is desirable to provide adequate clearances between slot widths and panel thicknesses by making the slot element slightly wider than the interlock panel thickness. Also, one of the preferred methods for manufacturing interlock panel 12 of a rigid plastic material is a blow molding of a rigid polyethylene resin or other comparably propertied material, and in such processing, and depending on uniformity of molding temperatures, pressures, and resin cooling rates, repeated precise dimensioning of slot elements 38 is not always obtained. Accordingly, it may be subsequently observed after two of interlock panels 12 are properly joined, that excessive gaps between cooperating slot elements 38 permit one of the panels to become tilted relative to the other, thus developing a degree of panel vertical instability.

To overcome such a condition developing after panel joining, I provide assembly 10 with one or more appropriately installed retainer clip elements 14. Each clip element 14 is generally U-shaped and is preferably cut to length from a metal or plastic extrusion. FIGS. 3A and 3B illustrate two different extrusion cross-sectional configurations suitable for use in the present invention. The side walls 50 and 52 of the FIG. 3A extrusion piece are straight. The side walls 54 and 56 of the FIG. 3B extrusion piece are each provided with outwardly-bowed vertical leg surfaces. It is desirable that the material of which retainer clip 14 is extruded have sufficient resiliency whereby the side walls of each inserted retainer clip develop a moderate degree of frictional resistance relative to the surfaces of the different slots 64 with which they cooperate.

In order to accommodate clip members 14, each improved interlock panel 12 is provided at top surface 18 with paired retention slots 64 throughout its respective length. In essence, each pair of slots 64 is aligned with the sidewall surfaces 32, 34 of a corresponding slot 38. The individual slots in each slot pair 64 are of sufficient width and depth to accommodate either of the leg elements 50, 52 or 54, 56 of U-shaped clip member 14, and are spaced apart a sufficient distance to accommodate the thickness of the cooperating interlock panel.

Referring to FIG. 1, for instance, should it be found that the left-most interlock Panel 12 can tilt excessively about its base 16 and relative to the right-most panel 12, it is only necessary to insert a clip member 14 over the base surface 16 of the inverted right-most Panel 12 with the clip sidewall elements 50 and 52 or 54 and 56 being projected into any slot pair 64 at panel zones of intersection.

Another embodiment of the present invention is illustrated in FIGS. 6 through 11 of the drawings in a partial interlock panel assembly designated generally as 80. Such assembly is comprised of joined interlock panels 82. As in the FIG. 1 embodiment, interlock panels 82 are typically identical in construction but in their cooperating joined relation one panel is inverted with respect to the other.

Figure 7:
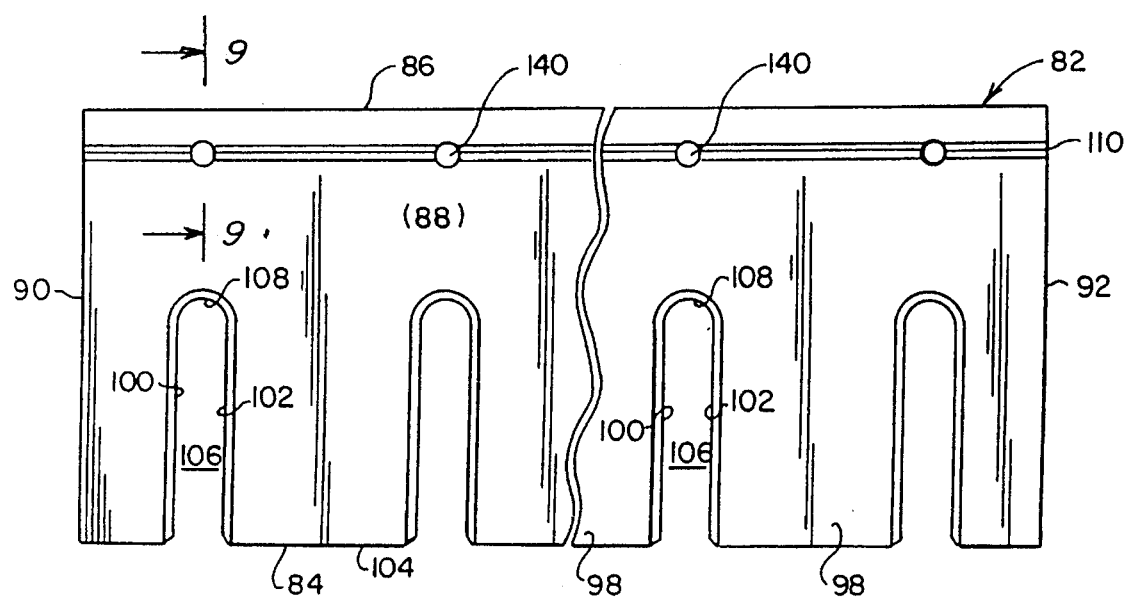
FIG. 7 is an elevational view of one of the interlock panels of FIG. 6.

Referring to FIG. 7, the alternate interlock panel 82 has a base 84, a top surface 86, and a central portion 88 which extends between 84 and top surface 86. Base 84 and top surface 86 define the height of interlock panel 82. The length of panel 82 is defined by a pair of end surfaces 90 and 92. A pair of opposite side surfaces 94 and 96 define the thickness of interlock panel 82. Panel 82 may have any desired length, height, or thickness.

A plurality of laterally spaced teeth 98 project downwardly (FIG. 7) from central portion 88 of interlock panel 82. Each tooth 98 has a pair of lateral side walls 100 and 102 and a longitudinally-extending front tooth edge 104 formed from a portion of base 84. It may be seen from FIG. 7 that the spaced lateral side walls 100 and 102 of adjacent teeth define a lateral tooth slot 106. The closed end of slot 106 is defined by a slot closure 108 which joins lateral side walls 100 and 102.

Each of the opposite side surfaces 94 and 96 of a panel 82 is provided with a stepped groove 110 having the same elements and functions as the elements and functions of grooves 42 described in connection with the invention embodiment of FIGS. 1 through 5. Accordingly, a restatement of the elements and functions of each stepped groove 110 is not provided in connection with FIGS. 6 through 11.

Figure 6:
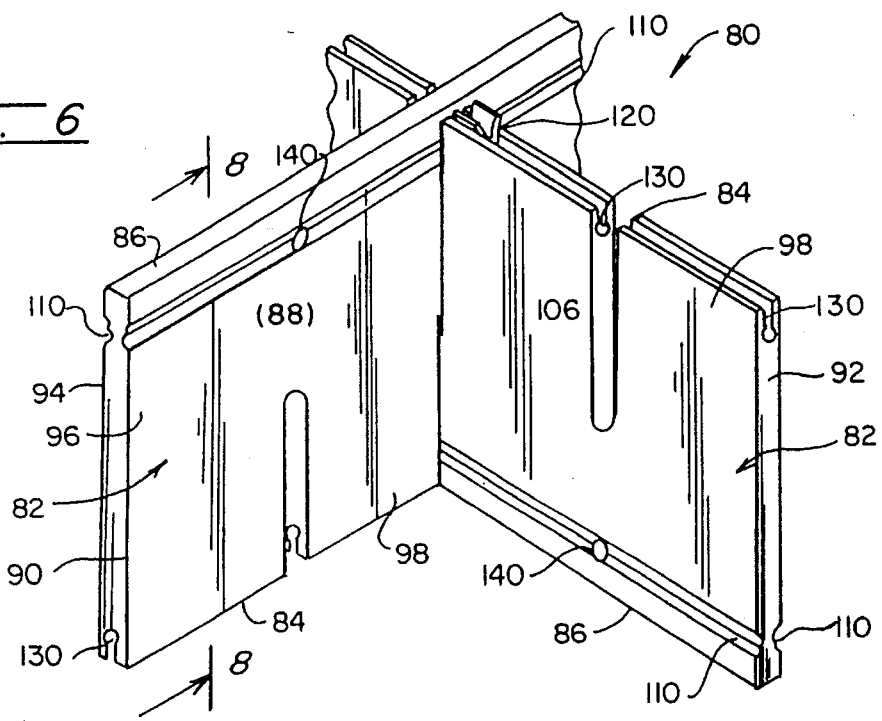
FIG. 6 is a perspective view of another pair of improved interlock panels constructed in accordance with the present invention illustrated in joined relation but prior to cooperative engagement of a different form of restraint means for minimizing rattling of adjoined panels.

As in the case of joined panels 12 of FIG. 1, joined panels 82 of FIG. 6 may exhibit substantial gaps between cooperating slot elements 106 that permit one of the panels to become tilted relative to the other, thus also developing a degree of panel vertical instability which may lead to the development of unwanted rattling sounds under some conditions of joined panel use.

To prevent such a condition from developing after the panels 82 are joined, I provide assembly 80 with one or more appropriately inserted and installed movable retainer clip elements such as retainer clip element 120 of FIG. 10. As will be hereinafter described, such clip element cooperates with a longitudinal slot and sleeve restraint element 130 formed in the base 84 of each interlock panel 82 and with a selected one of multiple, spaced apart restraint openings 140 which extend from side surface 94 to side surface 96 and are typically integrally formed with panel near top surface 86 and at the level of grooves 110. See FIGS. 7 and 9.

An enlarged perspective view of a typical retainer clip element 120 is provided in FIG. 10. Clip element is basically fabricated from a piece of plastic or metal extrusion and is comprised of a split barrel portion 122, a pair of compression tab portions 124 and 126 that are preferably integrally formed with the split barrel portion, and an interlock portion 128 that is a projection of split barrel portion 122 beyond one longitudinal extreme of compression tab portions 124 and 126 and that is sized to cooperate with a selected one of through restraint opening Each compression tab portion 124 and 126 is joined to split barrel portion 122 by an integral extension designated 129. Retainer clip element 120 and longitudinal restraint slot and sleeve element of panel 82 are correspondingly sized whereby, upon manually squeezing tab portions 124 and 126 together, clip element 120 may be inserted into longitudinal slot/sleeve restraint element from one of end surfaces 90 or 92 and moved longitudinally of integrally-formed slot/sleeve restraint element 130 until its clip element projection portion 128 is fully engaged with a selected through restraint opening 140 in the adjoining interlock panel Upon the manual release of tab portions 124 and 126 from compression, sufficient frictional resistance is developed between the exterior surface of clip portions 122 and 128 and the interior surfaces of slot/sleeve restraint element 130 and the selected through restraint opening 140 to prevent most unwanted subsequent disengagement of retainer clip projection 128 from engagement with its cooperating through restraint opening FIG. 11 is provided in the drawings to illustrate the fully-engaged relationship of a properly inserted and installed retainer clip element 120 with its selected panel through restraint opening 140.

Changes may be made to the above-described structure without departing from the scope of the claimed invention, and it is intended that all matter contained in the description thereof or shown in the accompanying drawings shall be interpreted as illustrative and not in a limiting sense.

I claim my invention as follows:

1. An interlock panel adapted to cooperate with at least one other interlock panel to form a cargo space divider structure having a plurality of individual compartments of a desired size, and comprising:

a rigid unitary member having a base, a top surface, a central portion intermediate said base and said top surface, spaced first and second end surfaces which define a length of said member, spaced first and second side surfaces which define a thickness of said member;

a plurality of laterally spaced teeth formed in said member which project outwardly from said central portion of said member;

wherein each of said teeth has a pair of lateral sidewalls and a longitudinally-extending front tooth edge formed from a portion of said base;

wherein spaced lateral sidewalls of adjacent teeth define a lateral tooth slot having a bottom slot edge which joins said lateral sidewalls;

a stepped groove formed in each of said spaced first and second side surfaces below said top surface and extending substantially the length of said member, each said stepped groove having a first offset that forms an undersurface for contact with a user's finger or thumb when said interlock panel is grasped by a user for manual insertion into or manual withdrawal from cooperation with another interlock panel; and wherein said stepped grooves each have a second offset adjacent and below said first offset, said second offset in-part forming a groove portion that is deeper than the undersurface formed by said first offset.

2. The interlock panel defined by claim 1 and further comprising pairs of retention slots which depend from said top surface positioned along the length of said rigid member, each of said retention slots being aligned with a respective lateral tooth sidewall.

3. The interlock panel defined by claim 2 wherein said pairs of retention slots are each comprised of retention slots which are spaced-apart along the length of said rigid unitary member by a distance which substantially corresponds to the interlock panel thickness defined by said first and second side surfaces.

4. The interlock panel defined by claim 2 and further comprising a cooperating U-shaped retainer clip member, said U-shaped retainer clip member cooperating with one pair of said retention slot pairs.

5. The interlock panel defined by claim 4 wherein said U-shaped retainer clip member has substantially parallel leg portions that cooperate with one of said retention slot pairs, said clip member leg portions being spaced apart by a distance that substantially corresponds to the thickness of said interlock panel defined by said interlock panel side surfaces.

6. The interlock panel defined by claim 1 and further comprising multiple, spaced-apart through restraint openings positioned along the length of said rigid member, each of said through restraint openings being aligned with a respective lateral tooth slot.

7. The interlock panel defined by claim 6 and further comprising a longitudinal slot and sleeve restraint element integrally formed with said rigid unitary member in and at said rigid unitary member base and extending between said spaced first and second end surfaces.

8. The interlock panel defined by claim 7 and further comprising a cooperating split barrel retainer clip member, said split barrel retainer clip member cooperating with said slot and sleeve restraint element.

9. An interlock panel adapted to cooperate with at least one other interlock panel to form a cargo space divider structure having a plurality of individual compartments of a desired size, and comprising;

a rigid unitary member having a base, a top surface, a central portion intermediate said base and said top surface, spaced first and second end surfaces which define a length of said, spaced first and second side surfaces which define a thickness of said member, and a pair of retention slots which depend downwardly from said top surface wherein each slot is defined by two parallel sidewalls;

a plurality of laterally spaced teeth formed in said member which project outwardly from said central portion of said member;

wherein each of said teeth has a pair of flat lateral sidewalls which are arranged perpendicular to said side surfaces and a longitudinally-extending front tooth edge formed from a portion of said base; and wherein spaced lateral sidewalls of adjacent teeth define a lateral tooth slot having a bottom slot edge which joins said lateral sidewalls and wherein each of said pairs of retention slots are aligned with a respective lateral tooth slot.

10. In a cargo space divider structure having a plurality of individual compartments of a desired size, in combination; a first interlock panel defining a first member having a base, a top surface, a central portion intermediate said base and said top surface, spaced first and second end surfaces which define a length of said member, spaced first and second side surfaces which define a thickness of said member, a plurality of laterally spaced teeth formed in said first member which project outwardly from said central portion of said first member, wherein each of said teeth has a pair of lateral sidewalls and a longitudinally-extending front tooth edge formed from a portion of said base, and wherein spaced lateral sidewalls of adjacent teeth define a lateral tooth slot having a bottom slot edge which joins said lateral sidewalls;

a second interlock panel defining a second member having a base, a top surface, a central portion intermediate said base and said top surface, spaced first and second end surfaces which define a length of said second member, spaced first and second side surfaces which define a thickness of said second member, a pair of retention slots which depend downwardly from said top surface, a plurality of laterally spaced teeth formed in said second member which project outwardly from said central portion of said second member, wherein each of said teeth has a pair of lateral sidewalls and a longitudinally-extending front tooth edge formed from a portion of said base, and wherein spaced lateral sidewalls of adjacent teeth define a lateral tooth slot having a bottom slot edge which joins said lateral sidewalls; and a U-shaped retainer clip means cooperating with each of said first and second interlock panels;

one of said first and second interlock panels being inverted and engaged at its tooth slot to the other of said first and second interlock panels and said U-shaped retainer clip means cooperating with said base of one of said first and second interlock panels and said pair of downwardly depending retention slots of the other of said first and second interlock panels.

* * * * *